United States Patent
Bunazawa et al.

(10) Patent No.: US 11,420,644 B2
(45) Date of Patent: Aug. 23, 2022

(54) VEHICLE CONTROL DEVICE, VEHICLE CONTROL SYSTEM, AND VEHICLE LEARNING DEVICE

(71) Applicant: TOYOTA JIDOSHA KABUSHIKI KAISHA, Toyota (JP)

(72) Inventors: Hideaki Bunazawa, Nagoya (JP); Atsushi Tabata, Okazaki (JP); Koichi Okuda, Toyota (JP); Ken Imamura, Toyota (JP); Kota Fujii, Nissin (JP); Keita Sasaki, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/332,206

(22) Filed: May 27, 2021

(65) Prior Publication Data
US 2021/0403014 A1    Dec. 30, 2021

(30) Foreign Application Priority Data

Jun. 25, 2020   (JP) .............................. JP2020-109675

(51) Int. Cl.
*B60W 50/00*    (2006.01)
*B60W 50/04*    (2006.01)
*B60W 50/02*    (2012.01)

(52) U.S. Cl.
CPC ...... *B60W 50/045* (2013.01); *B60W 50/0205* (2013.01); *B60W 2050/0026* (2013.01); *B60W 2050/0075* (2013.01); *B60W 2510/06* (2013.01)

(58) Field of Classification Search
CPC ........... B60W 50/045; B60W 50/0205; B60W 2050/0026; B60W 2050/0075; B60W 2510/06; B60W 2050/0088; B60W 50/02; B60W 2510/0676; B60W 2510/087; B60W 2510/107; B60W 10/06; B60W 10/08; B60W 10/10; F16H 2061/0087; F16H 59/72; B60K 6/445
See application file for complete search history.

(56) References Cited

U.S. PATENT DOCUMENTS

| | | | |
|---|---|---|---|
| 6,549,815 B1 | 4/2003 | Kaji | |
| 7,357,120 B2* | 4/2008 | Kaji | F02D 11/105 123/360 |
| 11,248,553 B2* | 2/2022 | Hashimoto | F02D 41/2445 |
| 2020/0263581 A1* | 8/2020 | Muto | F01N 3/18 |

FOREIGN PATENT DOCUMENTS

JP    2000-250602 A    9/2000

* cited by examiner

*Primary Examiner* — Justin Holmes
(74) *Attorney, Agent, or Firm* — Oliff PLC

(57) ABSTRACT

A vehicle control device includes: a storage device that stores relation-defining data that is data for defining a relation between a state of a vehicle and an action variable; and an executing device configured to acquire the state, operate a drivetrain device based on a value of the action variable, derive a reward such that the reward is larger when the state of the drivetrain device based on the acquired state satisfies a predetermined criterion, perform an updating of the relation-defining data using an updating map, and restrict the updating of the relation-defining data such that an updating amount of the relation-defining data is smaller when the drivetrain device is subject to a predetermined restriction.

8 Claims, 8 Drawing Sheets

VEHICLE CONTROL DEVICE, VEHICLE CONTROL SYSTEM, AND VEHICLE LEARNING DEVICE

CROSS-REFERENCE TO RELATED APPLICATION

This application claims priority to Japanese Patent Application No. 2020-109675 filed on Jun. 25, 2020, incorporated herein by reference in its entirety.

BACKGROUND

1. Technical Field

The disclosure relates to a vehicle control device, a vehicle control system, and a vehicle learning device.

2. Description of Related Art

Japanese Unexamined Patent Application Publication 2000-250602 (JP 2000-250602 A), for example, describes setting an appropriate gear ratio in accordance with the state of a vehicle by reinforcement learning.

SUMMARY

When driving of a transmission that adjusts the gear ration described above is subject to constraint, repeated reinforcement learning may result in the learning results greatly deviating from an appropriate value for when driving of the transmission is not subject to the constraint. This situation is not limited to transmissions, and can occur in drivetrain devices as well.

A vehicle control device according to a first aspect of the disclosure includes: a storage device that stores relation-defining data that is data for defining a relation between a state of a vehicle and an action variable that is a variable relating to operation of a drivetrain device installed in the vehicle; and an executing device configured to acquire the state based on a detection value of an onboard sensor, operate the drivetrain device based on a value of the action variable that is determined based on the relation-defining data and the state acquired by the executing device, derive a reward such that the reward is larger when the state of the drivetrain device based on the state acquired by the executing device satisfies a predetermined criterion than when the state of the drivetrain device based on the state acquired by the executing device does not satisfy the predetermined criterion, perform an updating of the relation-defining data using an updating map of which arguments are the state acquired by the executing device, the value of the action variable used in operating the drivetrain device, and the reward corresponding to the operation and which returns the relation-defining data that is updated such that an expected income regarding the reward calculated when the drivetrain device is operated following the relation-defining data increases, and restrict the updating of the relation-defining data such that an updating amount of the relation-defining data is smaller when the drivetrain device is subject to a predetermined restriction than when the drivetrain device is not subject to the predetermined restriction.

According to the above aspect, execution of updating processing is restricted such that the updating amount is smaller when a restriction regarding driving of the drivetrain device is in effect. Accordingly, a situation in which the relation-defining data greatly changes due to being updated when a restriction regarding driving of the drivetrain device is in effect can be suppressed. Accordingly, in the above configuration, learning results from reinforcement learning can be suppressed from greatly deviating from an appropriate value for operating the drivetrain device in normal operations.

In the above aspect, the executing device may be configured to determine whether an abnormality exists in the drivetrain device; and the drivetrain device may be subject to the predetermined restriction when the executing device determines that the abnormality exists in the drivetrain device.

When reinforcement learning is performed and there is an abnormality in the drivetrain device, there is a possibility that learning results from the reinforcement learning greatly deviate from an appropriate value for operating the drivetrain device in normal operations. According to the above configuration, execution of updating processing is restricted when determination is made that there is an abnormality. Accordingly, learning results from reinforcement learning can be suppressed from greatly deviating from an appropriate value for operating the drivetrain device in normal operations.

In the above aspect, the drivetrain device may include a transmission; and the drivetrain device may be subject to the predetermined restriction when a temperature of operating oil of the transmission is equal to or higher than a high-temperature threshold value.

When reinforcement learning is performed and the temperature of operating oil is excessively high, there is a possibility that learning results from the reinforcement learning greatly deviate from an appropriate value for operating the drivetrain device in a normal temperature range. According to the above configuration, execution of updating processing is restricted when the temperature of the operating oil is equal to or higher than the high-temperature-side threshold value. Accordingly, learning results from reinforcement learning can be suppressed from greatly deviating from an appropriate value for a temperature range in which the temperature of the operating oil is normal.

In the above aspect, the drivetrain device may include the transmission; and the drivetrain device may be subject to the predetermined restriction when the temperature of operating oil of the transmission is equal to or lower than a low-temperature threshold value.

When reinforcement learning is performed and the temperature of operating oil is excessively low, there is a possibility that learning results from the reinforcement learning greatly deviate from an appropriate value for operating the drivetrain device in a normal temperature range. According to the above configuration, execution of updating processing is restricted when the temperature of the operating oil is equal to or lower than the low-temperature-side threshold value. Accordingly, learning results from reinforcement learning can be suppressed from greatly deviating from an appropriate value for a temperature range in which the temperature of the operating oil is normal.

In the above aspect, the updating amount may be zero when the drivetrain device is subject to a predetermined restriction.

According to the above configuration, by setting the updating amount to zero through the restricting processing, a situation where the relation-defining data deviates from appropriate data in normal operations can be sufficiently suppressed, as compared to when the updating amount is made to be smaller but not made to zero.

A vehicle control system according to a second aspect of the disclosure includes: a storage device that stores relation-defining data that is data for defining a relation between a state of a vehicle and an action variable that is a variable relating to operation of a drivetrain device installed in the vehicle; and an executing device including a first executing device that is installed in the vehicle, and a second executing device that is separate from an onboard device, wherein the first executing device is configured to acquire the state based on a detection value of an onboard sensor, and operate the drivetrain device based on a value of the action variable that is determined based on the relation-defining data and the state acquired by the first executing device, at least one of the first executing device or the second executing device is configured to derive a reward such that the reward is larger when the state of the drivetrain device based on the state acquired by the first executing device satisfies a predetermined criterion than when the state of the drivetrain device based on the state acquired by the first executing device does not satisfy the predetermined criterion, the second executing device is configured to perform an updating of the relation-defining data using an updating map of which arguments are the state acquired by the first executing device, the value of the action variable used in operating the drivetrain device, and the reward corresponding to the operation and which returns the relation-defining data that is updated such that an expected income regarding the reward calculated when the drivetrain device is operated following the relation-defining data increases, and the at least one of the first executing device or the second executing device is further configured to restrict the updating of the relation-defining data such that an updating amount of the relation-defining data is smaller when the drivetrain device is subject to a predetermined restriction than when the drivetrain device is not subject to the predetermined restriction.

According to the above configuration, the second executing device executes updating processing, and accordingly computing load on the first executing device can be reduced as compared to when the first executing device executes the updating processing. Note that to say that the second executing device is a separate device from an onboard device means that the second executing device is not an onboard device.

A vehicle control device according to a third aspect of the disclosure includes the first executing device included in the vehicle control system of the second aspect.

A vehicle learning device according to a fourth aspect of the disclosure includes the second executing device included in the vehicle control system of the second aspect.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
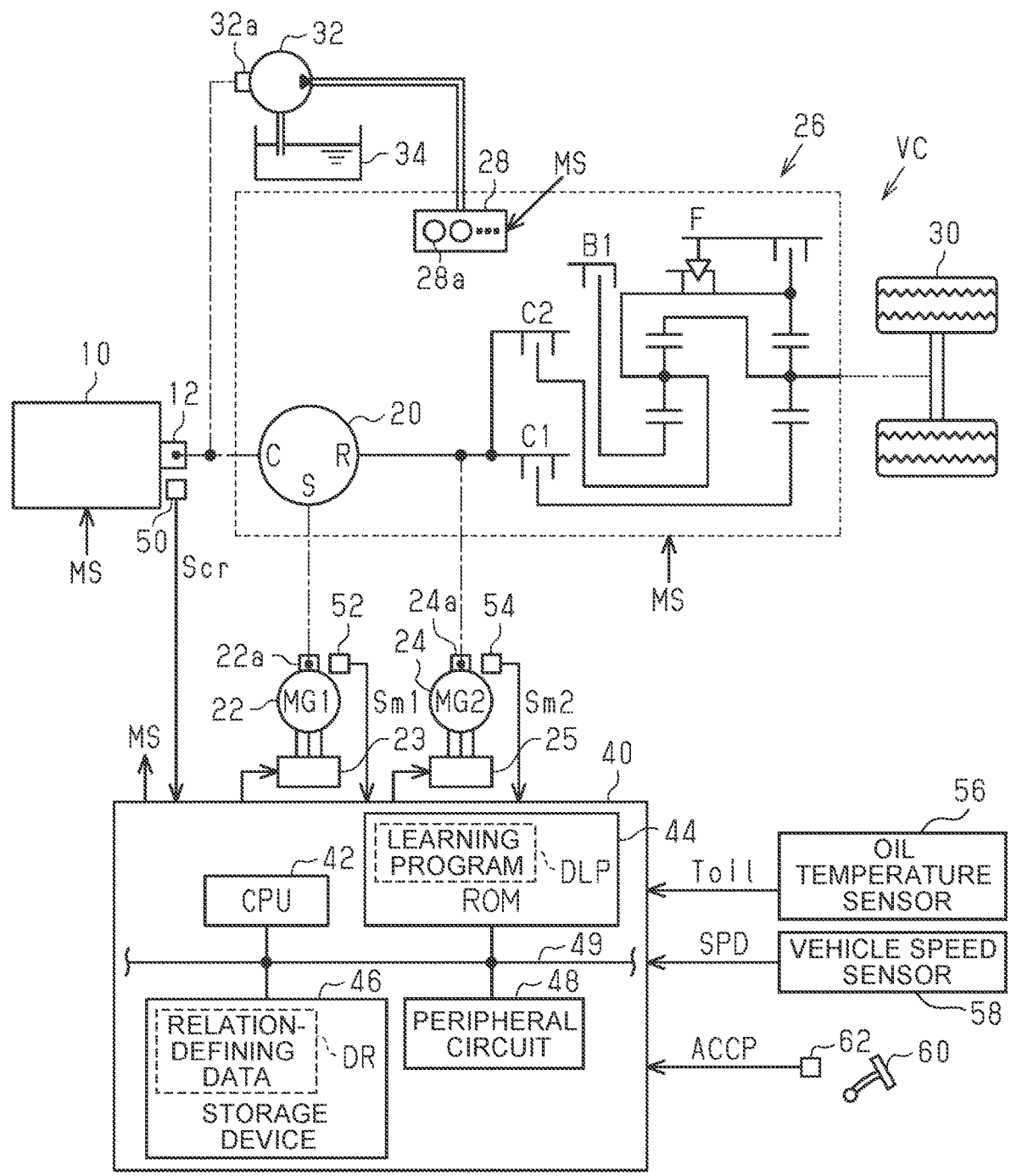
FIG. 1 is a diagram illustrating a control device and a drivetrain according to a first embodiment.

A first embodiment will be described below with reference to the drawings. A power split device 20 is mechanically linked to a crankshaft 12 of an internal combustion engine 10, as illustrated in FIG. 1. The power split device 20 splits power of the internal combustion engine 10, a first motor generator 22, and a second motor generator 24. The power split device 20 is provided with a planetary gear mechanism. The crankshaft 12 is mechanically linked to a carrier C of the planetary gear mechanism, a rotation shaft 22a of the first motor generator 22 is mechanically linked to a sun gear S thereof, and a rotation shaft 24a of the second motor generator 24 is mechanically linked to a ring gear R thereof. Output voltage of a first inverter 23 is applied to a terminal of the first motor generator 22, and output voltage of a second inverter 25 is applied to a terminal of the second motor generator 24.

In addition to the rotation shaft 24a of the second motor generator 24, drive wheels 30 are also mechanically linked to the ring gear R of the power split device 20 via a transmission 26. Also, a driven shaft 32a of an oil pump 32 is mechanically linked to the carrier C. The oil pump 32 is a pump that suctions oil within an oil pan 34 and discharges the oil into the transmission 26 as operating oil. Note that the operating oil discharged from the oil pump 32 is subjected to adjustment of the pressure thereof by a hydraulic pressure control circuit 28 within the transmission 26, and thus is used as operating oil. The hydraulic pressure control circuit 28 is provided with a plurality of solenoid valves 28a, and is a circuit that controls the state of the operating oil flowing and the hydraulic pressure of the operating oil by applying electricity to the solenoid valves 28a.

A control device 40 controls the internal combustion engine 10, and operates various types of operation portions of the internal combustion engine 10 to control torque, exhaust gas component ratio, and so forth, which are control amounts thereof. The control device 40 also controls the first motor generator 22, and operates the first inverter 23 to control torque, rotation speed, and so forth, which are control amounts thereof. The control device 40 also controls the second motor generator 24, and operates the second inverter 25 to control torque, rotation speed, and so forth, which are control amounts thereof.

When controlling the above control amounts, the control device 40 references an output signal Scr of a crank angle sensor 50, an output signal Sm1 of a first rotation angle sensor 52 that detects the rotation angle of the rotation shaft 22a of the first motor generator 22, and an output signal Sm2 of a second rotation angle sensor 54 that detects the rotation angle of the rotation shaft 24a of the second motor generator 24. The control device 40 also references oil temperature Toil that is the temperature of oil detected by an oil temperature sensor 56, vehicle speed SPD detected by a vehicle speed sensor 58, and an accelerator operation amount ACCP that is the amount of depression of an accelerator pedal 60, detected by an accelerator sensor 62.

The control device 40 is provided with a central processing unit (CPU) 42, read-only memory (ROM) 44, a storage device 46 that is electrically-rewritable nonvolatile memory, and a peripheral circuit 48, which are able to communicate via a local network 49. Now, the peripheral circuit 48 includes a circuit that generates clock signals to define internal operations, a power source circuit, a reset circuit, and so forth. The control device 40 controls the control amounts by the CPU 42 executing programs stored in the ROM 44.

Figure 2:
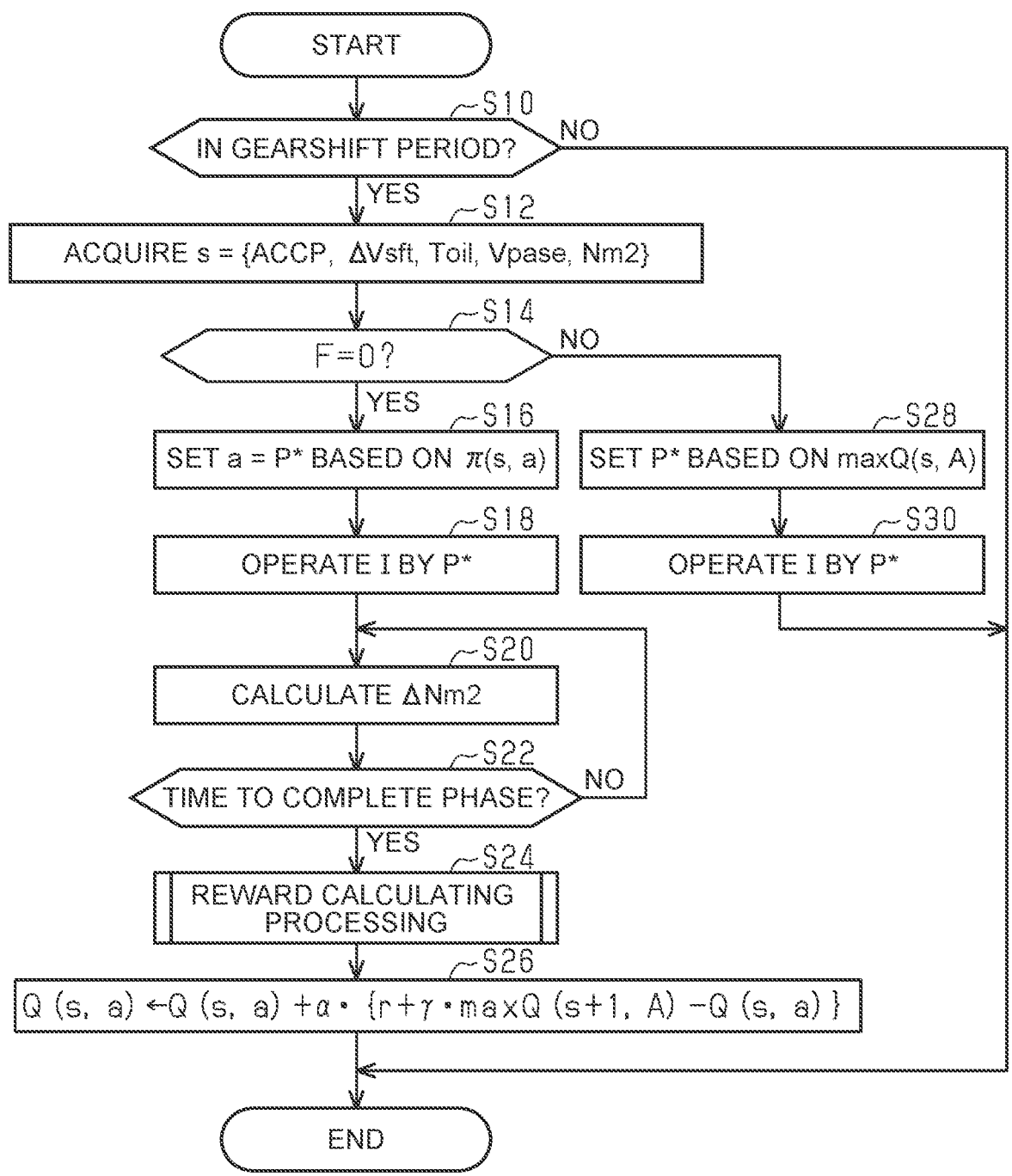
FIG. 2 is a flowchart showing procedures for processing that the control device according to the first embodiment executes.

FIG. 2 shows procedures of processing that the control device 40 executes. The processing shown in FIG. 2 is realized by a learning program DLP stored in the ROM 44 being repeatedly executed by the CPU 42 each time predetermined conditions are satisfied. Note that hereinafter, numerals following the letter "S" indicate step Nos. of each processing.

In the series of processing shown in FIG. 2, the CPU 42 first determines whether the current period is a period in which switching of gear ratios is to be performed, i.e., whether the current period is a gearshift period (S10). When determining the current period is a gearshift period (YES in S10), the CPU 42 acquires the accelerator operation amount ACCP, a gearshift variable ΔVsft, the oil temperature Toil, a phase variable Vpase, and a rotation speed Nm2 of the second motor generator 24, as a state s (S12). Note that the gearshift variable ΔVsft is a variable for identifying before transition of gear ratio and after transition, such as whether gearshift from first gear to second gear, from second gear to first gear, or the like. The phase variable Vpase is a variable for identifying which of three phases that determine stages of gearshift in a gearshift period the current period is.

That is to say, in the present embodiment, a gearshift period is sectioned into phase 1, phase 2, and phase 3. Phase 1 here is a period from the time of starting gear ratio switching control up to an amount of time, set in advance, elapsing. Phase 2 is a period from the end time of phase 1 up to the end time of a torque phase. In other words, this is a period up to torque transmissibility reaching zero by friction engaging elements switching from an engaged state to a disengaged state due to switching of the gear ratio. The CPU 42 determines the end point of phase 2 based on deviation of actual input shaft rotation speed from an input shaft rotation speed determined by the rotation speed of an output shaft of the transmission 26 and the gear ratio of before switching the gear ratio. The input shaft rotation speed may be rotation speed Nm2. Also, the CPU 42 calculates the output shaft rotation speed in accordance with the vehicle speed SPD. Phase 3 is a period from the end time of phase 2 up to completion of the gearshift.

Note that the aforementioned predetermined conditions at which the processing in FIG. 2 is executed are conditions that the current timing is a phase start timing. The above rotation speed Nm2 is calculated by the CPU 42 based on the output signals Sm2.

The state s is values of variables regarding which the relation thereof with the action variable is defined by relation-defining data DR stored in the storage device 46 illustrated in FIG. 1. Now, a hydraulic pressure command value of operating oil that drives the friction engaging elements involved in gear ratio switching will be exemplified in the present embodiment as an action variable. Specifically, with regard to phase 1 and phase 2, the hydraulic pressure command value is a constant value in these periods, and is a hydraulic pressure command value that rises at a constant rate in phase 3. Note that the action variable for phase 3 that is actually included in the relation-defining data DR may be a pressure rise rate.

Specifically, the relation-defining data DR includes an action value function Q. The action value function Q is a function where the state s and the action a are independent variables, and expected income as to the state s and the action a is a dependent variable. In the present embodiment, the action value function Q is a function in a table format.

Next, the CPU 42 determines whether a restriction flag F is "0" (S14). The restriction flag F indicates that reinforcement learning is permitted when the restriction flag F is "0", and indicates that reinforcement learning is restricted when the restriction flag F is "1".

When determining that the restriction flag F is "0" (YES in S14), the CPU 42 calculates the value of the action variable based on policy π defined by the relation-defining data DR (S16). In the present embodiment, an ε greedy policy is exemplified as the policy. That is to say, a policy is exemplified that determines a rule in which, when a state s is given, the largest action variable in the action value function Q at which an independent variable is the given state s (hereinafter referred to as greedy action ag) is selected with priority, while at the same time other actions are selected at a predetermined probability. Specifically, when the total number of values that the action variable can assume is expressed as "|A|", the probability of assuming an action variable value other than that of the greedy action is each "ε|A|".

Now, since the action value function Q is table format data in the present embodiment, the state s serving as an independent variable has a certain breadth. That is to say, when defining the action value function Q at 10% increments with regard to the accelerator operation amount ACCP, a case in which the accelerator operation amount ACCP is "3%" and a case in which the accelerator operation amount ACCP is "6%" are not regarded as different states s only by the difference in the accelerator operation amount ACCP.

Next, the CPU 42 operates an applied electrical current I so that the applied electrical current I of the solenoid valves 28a is determined based on hydraulic pressure command value P* (S18). The CPU 42 then calculates a flare amount (a racing amount) ΔNm2 (S20). The flare amount ΔNm2 is a quantification of the flare amount of the rotation speed of the input shaft of the transmission 26 during the gearshift period, and is calculated as an overshoot amount of rotation speed Nm2 as to rotation speed Nm2* that is a reference set in advance. The CPU 42 sets the reference rotation speed Nm2* in accordance with the accelerator operation amount ACCP, the vehicle speed SPD, and the gearshift variable ΔVsft. This processing can be realized by map computation of the reference rotation speed Nm2* by the CPU 42, in a state where map data, in which the accelerator operation amount ACCP, the vehicle speed SPD, and the gearshift variable ΔVsft are input variables, and the reference rotation speed Nm2* is an output variable, is stored in the ROM 44 in advance. Note that map data is data of sets of discrete values of the input variables and values of the output variables corresponding to each of the values of the input variables. Map computation may also be performed in which, when a value of an input variable matches one of the values of the input variables in the map data, the corresponding value of the output variable in the map data is used as a computation result, and when there is no match, a value obtained by interpolation of a plurality of values of output variables included in the map data is used as a computation result, for example.

The CPU 42 executes the processing of S20 until the current phase ends (NO in S22). When determining that the current phase ends (YES in S22), the CPU 42 calculates a reward for the action used in the processing of S16 (S24).

Figure 3:
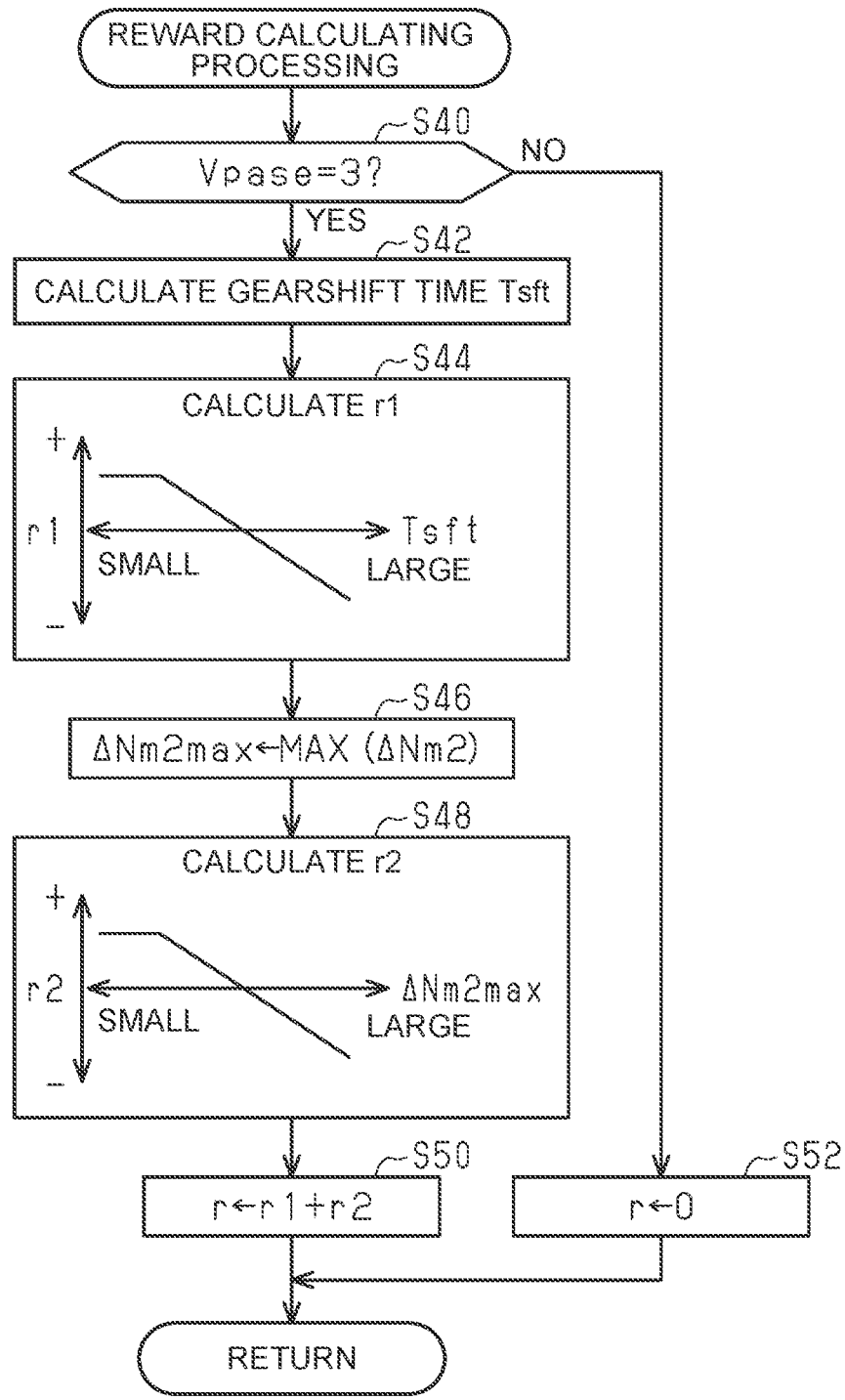
FIG. 3 is a flowchart showing detailed procedures for part of processing that the control device according to the first embodiment executes.

FIG. 3 shows details of the processing of S24. In the series of processing shown in FIG. 3, the CPU 42 first determines whether the phase variable Vpase is "3" (S40). When determining that the phase variable Vpase is "3" (YES in S40), the gearshift is complete, and accordingly the CPU 42 calculates a gearshift time Tsft that is the amount of time required for the gearshift (S42). The CPU 42 then calculates a reward r1 in accordance with the gearshift time Tsft (S44). More specifically, the CPU 42 calculates a larger value for the reward r1 when the gearshift time Tsft is small, as compared to when the gearshift time Tsft is large.

Next, the CPU 42 substitutes the largest value of the flare amount ΔNm2 repeatedly calculated at a predetermined cycle in the processing of S20, into a flare amount maximum value ΔNm2max (S46). The CPU 42 then calculates a reward r2 in accordance with the flare amount maximum value ΔNm2max (S48). More specifically, the CPU 42 calculates a larger value for the reward r2 when the flare amount maximum value ΔNm2max is small, as compared to when the flare amount maximum value ΔNm2max is large.

The CPU 42 then substitutes the sum of the reward r1 and the reward r2 into the reward r for the action used in the processing of S16 (S50). On the other hand, when determining that the phase variable Vpase is "1" or "2" (NO in S40), the CPU 42 substitutes "0" into the reward r (S52).

Note that when the processing of S50 or S52 is complete, the CPU 42 completes the processing of S24. Returning to FIG. 2, the CPU 42 updates the action value function Q (s, a) used in the processing of S16 based on the reward r (S26). Note that the action value function Q (s, a) used in the processing of S16 is the action value function Q (s, a) that takes the state s acquired by the processing of S12 and the action a set by the processing of S16 as independent variables.

In the present embodiment, the action value function Q (s, a) is updated by so-called Q learning, which is policy-off temporal difference (TD) learning, defined in the following Expression (c1).

$$Q(s,a) \leftarrow Q + \alpha \cdot \{r + \gamma \cdot \max Q(s+1,A) - Q(s,a)\} \quad (c1)$$

in which discount rate γ and learning rate α are used for the update amount "α·{r+γ·maxQ (s+1, A)–Q (s, a)}" of the action value function Q(s, a). Note that the discount rate γ is a constant that is larger than "0" and is equal to or smaller than "1". Also, "maxQ (s+1, a)" means a state variable at the time of phase completion, i.e., the largest value of the action value function Q of which an independent variable is the state s+1 to be acquired by the processing of S12 next time in the series of processing shown in FIG. 2. Note that unless the current phase is phase 3, the state s acquired by the processing of S12 next time in the series of processing shown in FIG. 2 is the state s+1, used in the processing of S26. Also, when the current phase is phase 3, the state s acquired by the processing of S12 this time in the series of processing shown in FIG. 2 is set to state s+1.

On the other hand, when the CPU 42 determines that the restriction flag F is "1" in the processing of S14 (NO in S14), the hydraulic pressure command value P* is set by the greedy action ag that is the largest action a in the action value function Q at which an independent variable is the given state s (S28). The CPU 42 then operates the applied electrical current I of the solenoid valves 28a so as to realize the hydraulic pressure command value P* set by the processing of S28 (S30).

Note that when the processing of S26 or S30 is complete, or when a negative determination is made in the processing of S10, the CPU 42 ends the series of processing shown in FIG. 2 once. Also note that the relation-defining data DR at the time of shipping a vehicle VC is data in which learning has been performed by processing similar to the processing in FIG. 2 in a prototype vehicle or the like of the same specifications. That is to say, the processing of FIG. 2 is processing to update the hydraulic pressure command value P* set before shipping the vehicle VC to a value that is appropriate for the vehicle VC to actually travel on the road, by reinforcement learning.

Figure 4:
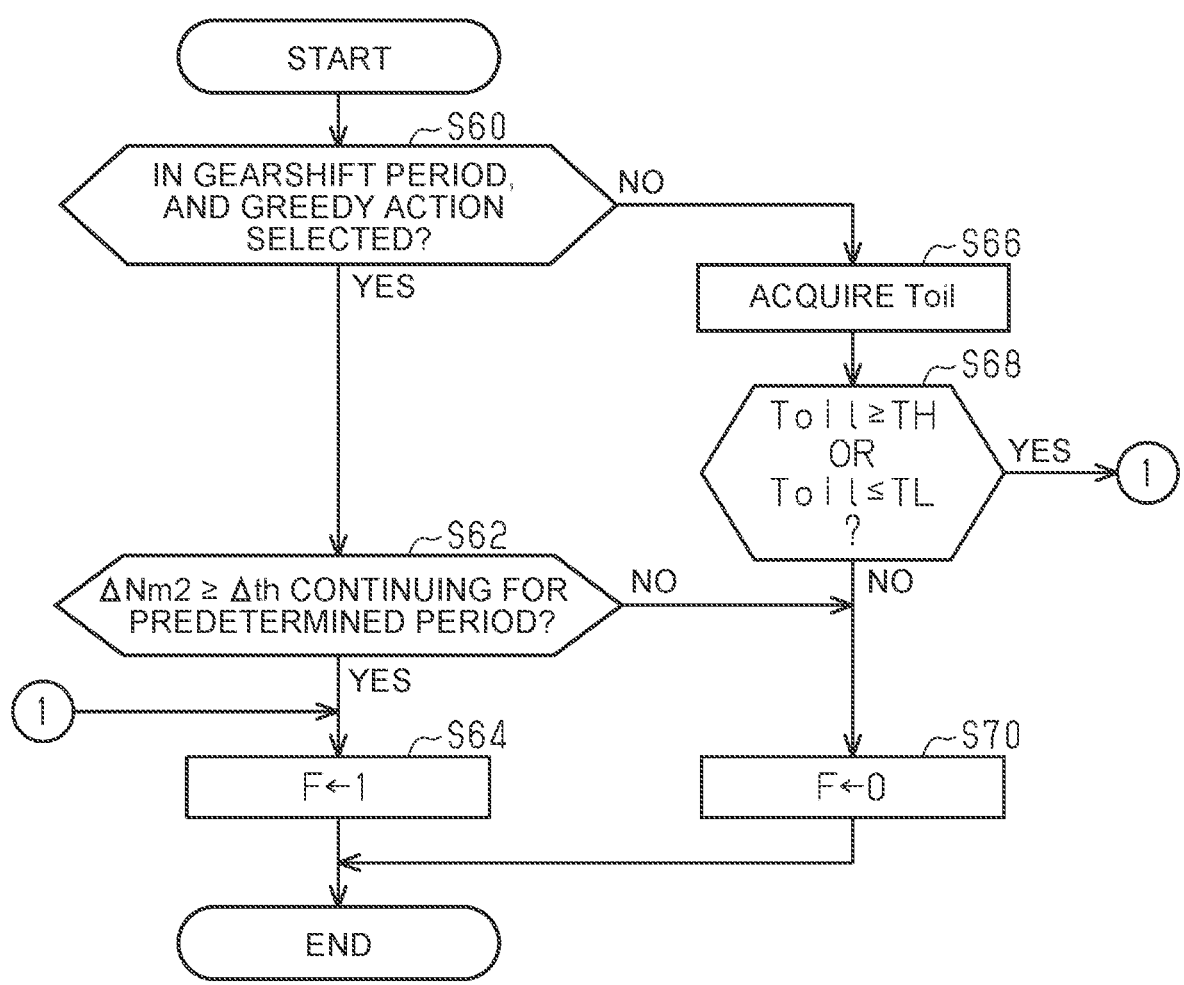
FIG. 4 is a flowchart showing procedures for processing that the control device according to the first embodiment executes.

FIG. 4 shows procedures for processing regarding setting the value of the above-described restriction flag F. The processing shown in FIG. 4 is realized by the learning program DLP stored in the ROM 44 being repeatedly executed by the CPU 42 at a predetermined cycle, for example.

In the series of processing shown in FIG. 4, the CPU 42 first determines whether the current period is a gearshift period and also a period in which a greedy action ag is selected (S60). When making a positive determination in the processing of S60 (YES in S60), the CPU 42 determines whether a state in which the flare amount ΔNm2 is equal to or higher than a threshold value Δth is continuing for a predetermined period (S62). This processing is processing to determine whether an abnormality is occurring in gearshift control. That is to say, when greedy action is employed in the gearshift period, the flare amount ΔNm2 is not expected to be very large. When the flare amount ΔNm2 exceeds the threshold value nonetheless, an abnormality is conceivably occurring, such as foreign matter becoming caught in the solenoid valves 28a and the solenoid valves 28a malfunctioning, for example, controllability of the friction engaging elements decreasing due to deterioration of the operating oil leading to a great amount of air becoming mixed in the operating oil, or the like.

When determining that such a state is continuing for a predetermined period (YES in S62), the CPU 42 substitutes "1" into the restriction flag F (S64). On the other hand, when making a negative determination in the processing of S60, the CPU 42 acquires the oil temperature Toil (S66). The CPU 42 then determines whether the logical disjunction of the oil temperature Toil being equal to or higher than a high-temperature-side threshold value TH and the oil temperature Toil being equal to or lower than a low-temperature-side threshold value (low-temperature threshold value) TL is true (S68). The high-temperature-side threshold value (high-temperature threshold value) TH here is set to a value higher than the largest value of the temperature that the oil temperature Toil can be assumed to reach in a normal usage state of the transmission 26. Also, the low-temperature-side threshold value TL here is set to a value lower than the smallest value of the temperature that the oil temperature Toil can be assumed to reach in a normal usage state of the transmission 26. This processing is processing to determine whether restrictions may occur in driving of the transmission 26 due to the oil temperature Toil being outside of the assumed temperature range, and consequently the actual viscosity largely deviating from the viscosity in the assumed temperature range, and so forth.

When determining that the logical disjunction is true (YES in S68), the CPU 42 advances to the processing of S64. Conversely, when determining that the logical disjunction is false (NO in S68), or when making a negative determination in the processing of S62, the CPU 42 substitutes "0" into the restriction flag F (S70).

Note that when the processing of S64 or S70 is complete, the CPU 42 ends the series of processing shown in FIG. 4 once. Effects and advantages of the present embodiment will be described here.

In a gearshift period, the CPU 42 selects a greedy action ag and operates applied electrical current for the solenoid valves 28a, while searching for a better hydraulic pressure command value P* using actions other than greedy actions, in accordance with a predetermined probability. The CPU 42 then updates the action value function Q used to determine the hydraulic pressure command value P* by Q learning. Accordingly, an appropriate hydraulic pressure command value P* when the vehicle VC is actually traveling can be learned by reinforcement learning.

However, when an abnormality occurs in gearshift control, or when the oil temperature Toil is abnormally high or the oil temperature Toil is abnormally low, the CPU 42 does not permit reinforcement learning. Thus, the greedy action ag that the relation-defining data DR indicates can be suppressed from being updated to a value that is largely deviated from an appropriate value for operating the transmission 26 in normal gear ratio switching.

Second Embodiment

A second embodiment will be described below with reference to the drawings, primarily regarding points of difference from the first embodiment.

Figure 5:
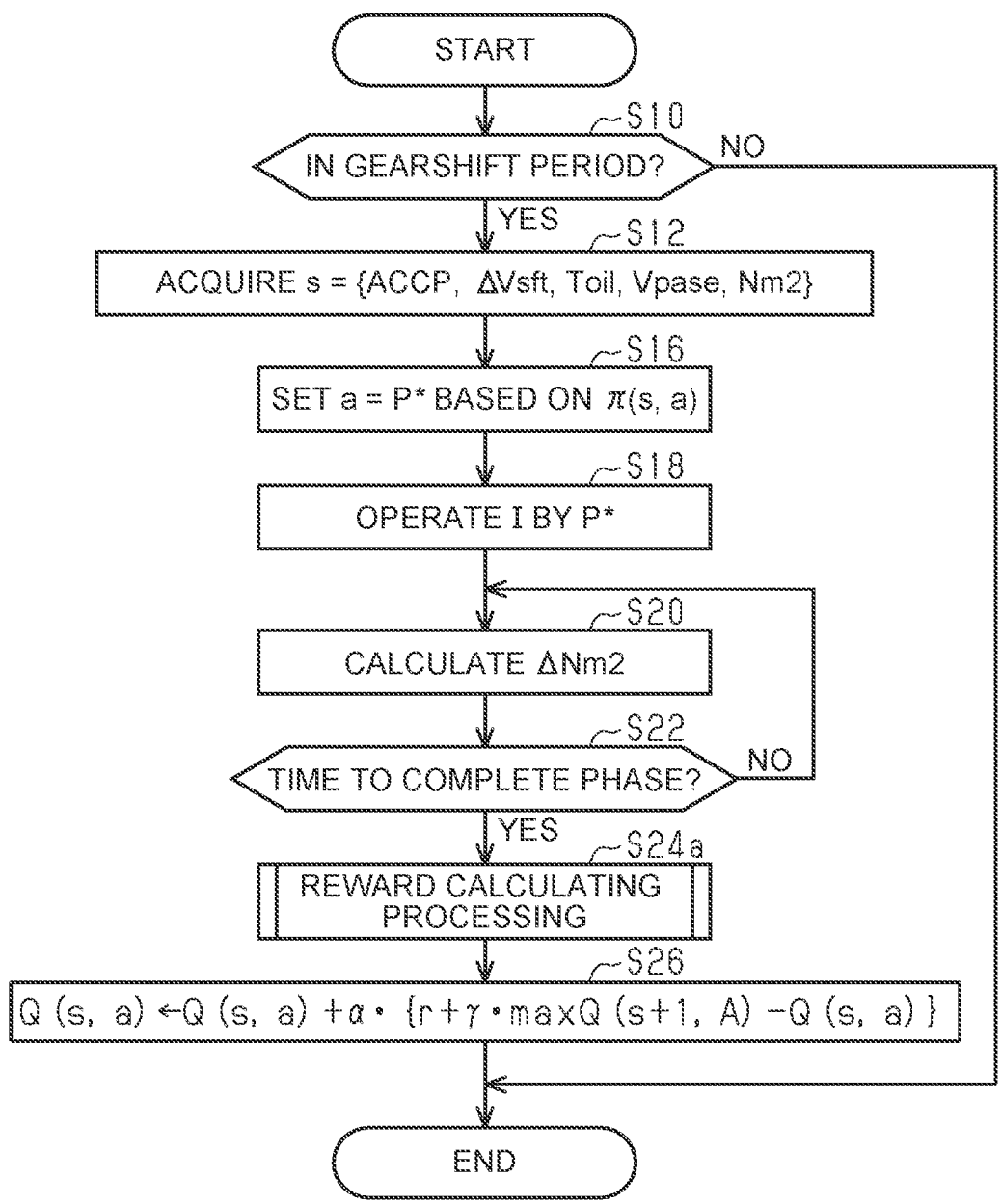
FIG. 5 is a flowchart showing procedures for processing that a control device according to a second embodiment executes.

FIG. 5 shows procedures of processing that the control device 40 executes. The processing shown in FIG. 5 is realized by a program stored in the ROM 44 being repeatedly executed by the CPU 42 at a predetermined cycle, for example. Note that in FIG. 5, processing corresponding to processing shown in FIG. 2 is denoted by the same step No., for sake of convenience.

In the series of processing shown in FIG. 5, when completing the processing of S12, the CPU 42 transitions to the processing of S16. That is to say, in the present embodiment, processing of selecting which of the processing of S16 and the processing of S28 to transition to in accordance with the value of the restriction flag F is not executed. On the other hand, when making a positive determination in the processing of S22, the CPU 42 executes the processing of S24a and transitions to the processing of S26.

Figure 6:
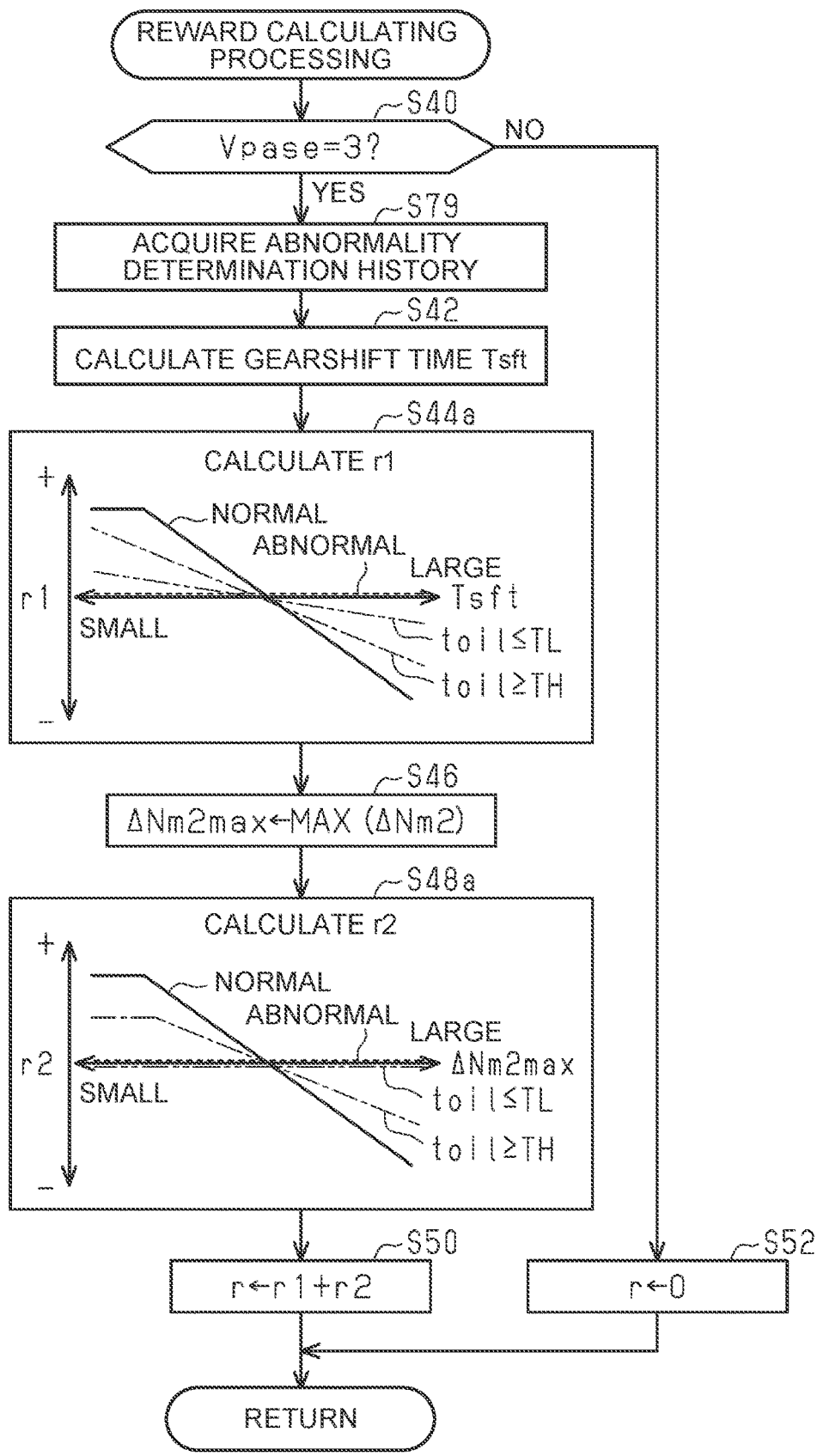
FIG. 6 is a flowchart showing detailed procedures for part of processing that the control device according to the second embodiment executes.

FIG. 6 shows details of the processing of S24a. Note that in FIG. 6, the processing corresponding to processing shown in FIG. 3 is denoted by the same step No., for sake of convenience. In the series of processing illustrated in FIG. 6, when making a positive determination in the processing of S40, the CPU 42 acquires history of abnormality determination (S79). That is to say, history of making positive determinations in the processing of S62 in FIG. 4 is acquired. When completing the processing of S42, the CPU 42 calculates the reward r1 in accordance with the gearshift time Tsft (S44a). When determination is made that there is an abnormality, the CPU 42 sets the reward r1 to "0" regardless of the gearshift time Tsft. Also, when the oil temperature Toil is no more than the low-temperature-side threshold value TL, the CPU 42 calculates the reward r1 as being a larger value when the gearshift time Tsft is small as compared to when the gearshift time Tsft is large, but sets the absolute value of the reward r1 to a smaller value as compared to when the oil temperature Toil is higher than the low-temperature-side threshold value TL and lower than the high-temperature-side threshold value TH. Also, when the oil temperature Toil is no less than the high-temperature-side threshold value TH, the CPU 42 calculates the reward r1 as being a larger value when the gearshift time Tsft is small as compared to when the gearshift time Tsft is large, but sets the absolute value of the reward r1 to a smaller value as compared to when the oil temperature Toil is higher than the low-temperature-side threshold value TL and lower than the high-temperature-side threshold value TH. Note that in the present embodiment, when the oil temperature Toil is no less than the high-temperature-side threshold value TH, the absolute value of the reward r1 is calculated as being a larger value as compared to when the oil temperature Toil is no more than the low-temperature-side threshold value TL.

Next, the CPU 42 executes the processing of S46, and moreover calculates the reward r2 corresponding to the flare amount maximum value $\Delta Nm2max$ (S48a). When determination is made that there is an abnormality or the oil temperature Toil is equal to or lower than the low-temperature-side threshold value TL, the CPU 42 sets the reward r2 to "0", regardless of the flare amount maximum value $\Delta Nm2max$. Also, when the oil temperature Toil is no less than the high-temperature-side threshold value TH, the CPU 42 calculates the reward r2 as being a larger value when the flare amount maximum value $\Delta Nm2max$ is small as compared to when the flare amount maximum value $\Delta Nm2max$ is large, but sets the absolute value of the reward r2 to a smaller value as compared to when the oil temperature Toil is higher than the low-temperature-side threshold value TL and lower than the high-temperature-side threshold value TH.

Note that when completing the processing of S48a, the CPU 42 transitions to the processing of S50. Thus, when an abnormality is occurring in gearshift control, the CPU 42 according to the present embodiment sets the reward r1 to "0", thereby not permitting updating of the relation-defining data DR. Also, when the oil temperature Toil is equal to or lower than the low-temperature-side threshold value TL, the CPU 42 sets the reward r2 based on the flare amount maximum value $\Delta Nm2max$ to "0", thereby not permitting updating of the relation-defining data DR based on the flare amount maximum value $\Delta Nm2max$. Accordingly, the greedy action ag that the relation-defining data DR indicates can be suppressed from being updated to a value that is largely deviated from an appropriate value in normal gear ratio switching.

Also, when the oil temperature Toil is equal to or lower than the low-temperature-side threshold value TL or equal to or higher than the high-temperature-side threshold value TH, the CPU 42 gives a reward in accordance with the gearshift time Tsft, but makes the absolute value thereof to be small, thereby limiting updating so that the amount of updating of the relation-defining data DR is small. Also, when the oil temperature Toil is equal to or higher than the high-temperature-side threshold value TH, the CPU 42 gives a reward in accordance with the flare amount maximum value $\Delta Nm2max$, but makes the absolute value thereof to be small, thereby limiting updating so that the amount of updating of the relation-defining data DR is small. Thus, the relation-defining data DR can be updated so that the greedy action ag slightly reflects a hydraulic pressure command value P* that is optimal when the oil temperature Toil is excessively deviated from the normal temperature.

Third Embodiment

A third embodiment will be described below with reference to the drawings, primarily regarding points of difference from the first embodiment.

Figure 7:
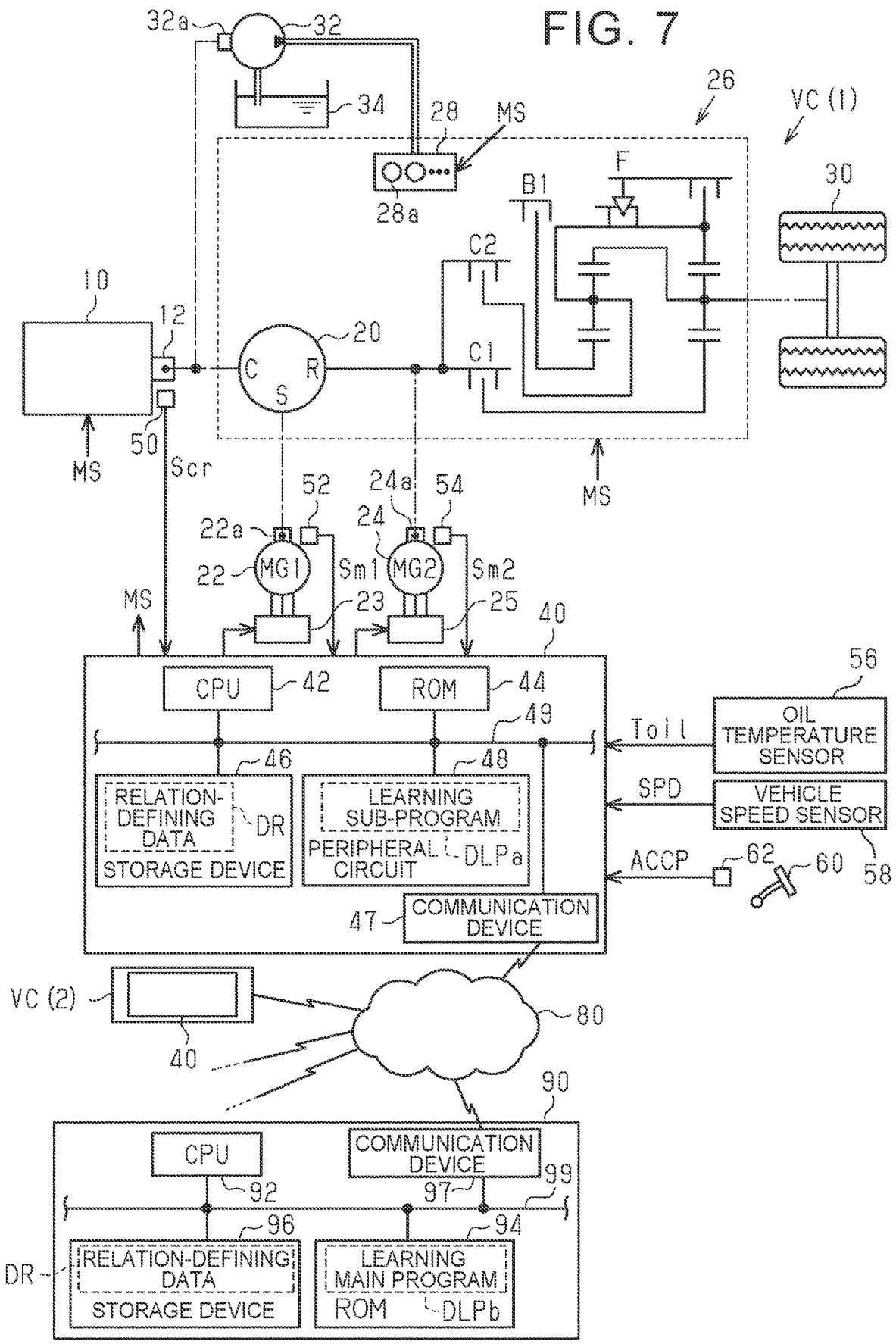
FIG. 7 is a diagram illustrating a configuration of a control system according to a third embodiment.

FIG. 7 illustrates a configuration of a system according to the present embodiment. Note that members in FIG. 7 that correspond to members illustrated in FIG. 1 are denoted by the same signs for sake of convenience, and description thereof will be omitted. The control device 40 of a vehicle VC(1) is provided with a communication device 47, and is able to communicate with a data analyzing center 90 via an external network 80 using the communication device 47, as illustrated in FIG. 7.

The data analyzing center 90 analyzes data transmitted from a plurality of vehicles VC(1), VC(2), and so on. The data analyzing center 90 is provided with a CPU 92, ROM 94, a storage device 96, and a communication device 97, which are able to communicate via a local network 99. Note that the storage device 96 is an electrically-rewritable non-volatile device, and stores the relation-defining data DR.

Figure 8:
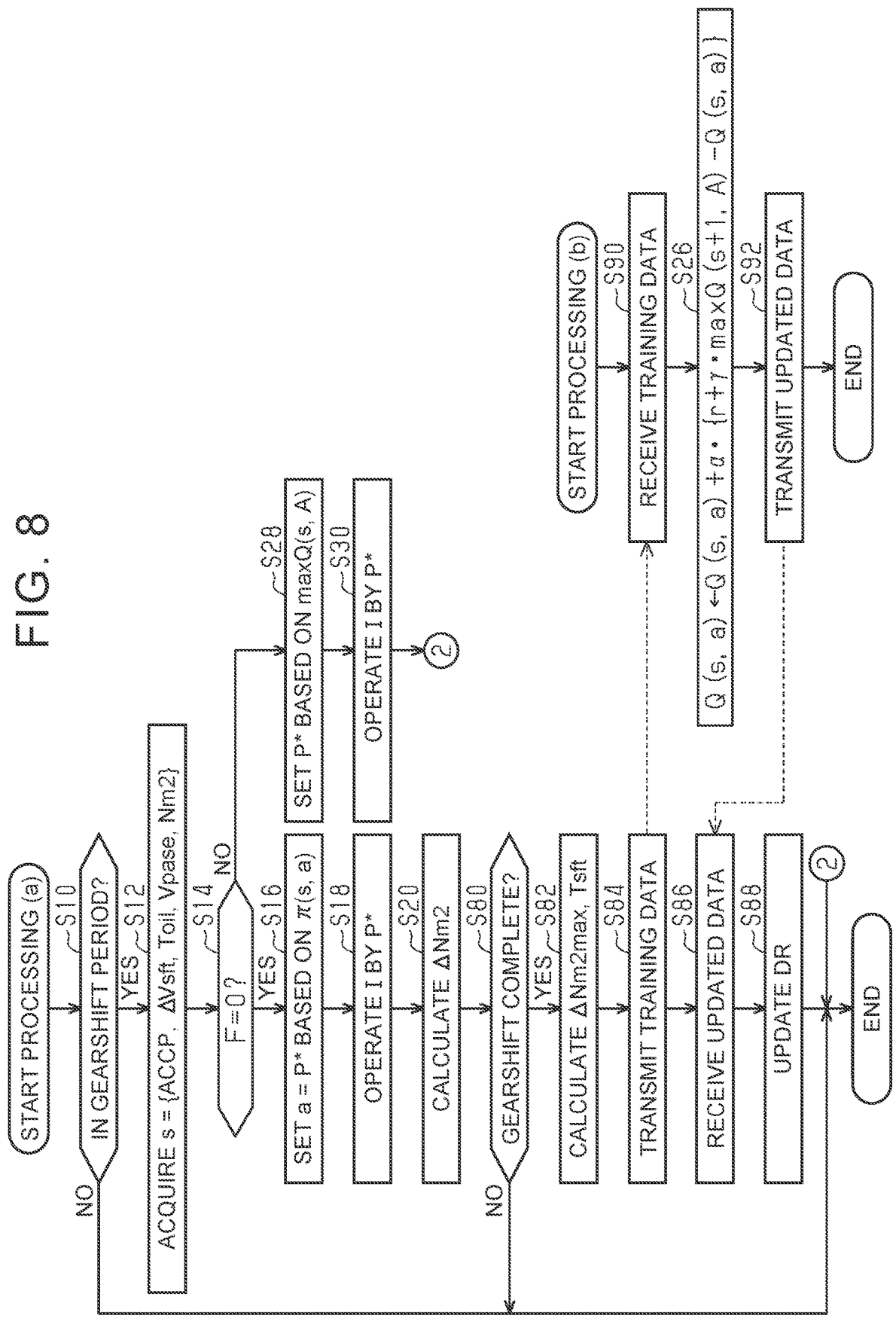
FIG. 8 is a flowchart showing procedures for processing that the control system executes.

FIG. 8 shows processing procedures of reinforcement learning according to the present embodiment. Processing (a) in FIG. 8 is realized by the CPU 42 executing a learning sub-program DLPa stored in the ROM 44 illustrated in FIG. 7. Also, processing (b) in FIG. 8 is realized by the CPU 92 executing a learning main program DLPb stored in the ROM 94. Note that processing in FIG. 8 that corresponds to processing shown in FIG. 2 is denoted by the same step No., for sake of convenience. The processing shown in FIG. 8 will be described below following the time sequence of reinforcement learning.

In processing (a) in FIG. 8, the CPU 42 of the control device 40 first executes the processing of S10 through S20, and then determines whether the gearshift is completed (S80). When determining that the gearshift is completed (YES in S80), the CPU 42 calculates the flare amount maximum value ΔNm2max and the gearshift time Tsft (S82). The CPU 42 then operates the communication device 47 to transmit the flare amount maximum value ΔNm2max and the gearshift time Tsft, the state s in the gearshift period, the action a, and the restriction flag F, which are data for updating the relation-defining data DR by reinforcement learning, along with an identification code of the vehicle VC(1) (S84).

In conjunction with this, the CPU 92 of the data analyzing center 90 receives the data for updating the relation-defining data DR by reinforcement learning (S90), as shown in processing (b) in FIG. 8. Based on the received data, the CPU 92 then executes the processing of S26. The CPU 92 then operates the communication device 97 to transmit the updated relation-defining data DR to the transmission source of the data received by the processing of S90 (S92). Note that when completing the processing of S92, the CPU 92 ends the processing (b) in FIG. 8 once.

In response, the CPU 42 receives the updated relation-defining data DR, as shown in processing (a) in FIG. 8 (S86). The CPU 42 then updates the relation-defining data DR used in the processing of S16 and S28, based on the received data (S88). Note that when completing the processing of S88 or S30, or when making a negative determination in the processing of S10 or S80, the CPU 42 ends the processing (a) in FIG. 8 once. However, when making a negative determination in the processing of S80 and the current time is not the time for phase completion, the CPU 42 does not newly execute the processing of S12, S16, and S18 the next time the processing (a) in FIG. 8 is executed, and this is substantially equivalent to returning to the processing of S20.

In this way, the updating processing of the relation-defining data DR is performed externally from the vehicle VC(1) according to the present embodiment, and accordingly the computation load on the control device 40 can be reduced. Further, by receiving data from the vehicles VC(1), VC(2), and so on in the processing of S90, and performing the processing of S26, for example, the count of data used for learning can be easily increased.

Correlative Relation

An example of a drivetrain device is the transmission 26. An example of an executing device is the CPU 42 and the ROM 44. An example of a storage device is the storage device 46. An example of acquiring processing is the processing of S12, S42, and S46. An example of operating processing is the processing of S18. An example of reward computing processing is the processing of S24 and S24a. An example of updating processing is the processing of S26. An example of restriction processing is transitioning to S28 when making a negative determination in the processing of S14 in FIG. 2, and is processing of S44a and S48a in the processing in FIG. 6. An example of abnormality determining processing is the processing of S62. An example of restriction processing is transitioning to S28 when making a positive determination in the processing of S68 in FIG. 4 and making a negative determination in the processing of S14 in FIG. 2, and is processing of S44a and S48a in the processing in FIG. 6. An example of updating processing in which the update amount is zero is shown in FIG. 2. An example of a first executing device is the CPU 42 and the ROM 44, and an example of a second executing device is the CPU 92 and the ROM 94.

Other Embodiments

Note that the embodiments may be modified and carried out as follows. The embodiments and the following modifications may be combined with each other and carried out insofar as there is no technological contradiction.

Regarding Abnormality Determining Processing

Abnormality determining processing is not limited to the processing of S62. For example, the abnormality determining processing may be determining whether there is an abnormality based on behavior of electric current flowing to the solenoid valves 28a. Now, actual electric current responsivity when increasing the command value of electric current flowing to the solenoid valves 28a in steps tends to be higher when the solenoid valves 28a are malfunctioning, as compared to when not malfunctioning. Accordingly, whether there is an abnormality can be determined in accordance with response speed, for example. Note that this abnormality determining processing may be executed outside of gearshift period as well. For example, this can be realized by determining whether there is an abnormality based on the behavior of electric current when finely undulating the electric current flowing to the solenoid valves 28a such that the solenoid valves 28a are finely vibrated under conditions of maintaining disengaged friction engaging elements in the disengaged state.

Abnormality determining processing is not limited to processing for determining whether there is an abnormality in gearshift control. Known abnormality determining processing for an internal combustion engine, for example, may be employed when the drivetrain device to be operated in accordance with values of the action variable based on the relation-defining data DR is an internal combustion engine, as described later in the section "Regarding Drivetrain Device". Also, known abnormality determining processing for a rotating electrical machine or a drive circuit, for example, may be employed when the drivetrain device to be operated in accordance with values of the action variable based on the relation-defining data DR is a drive circuit of a rotating electrical machine.

Regarding Restriction Processing

The reward r1 in accordance with the gearshift time Tsft is permitted to be other than zero when the oil temperature Toil is equal to or higher than the high-temperature-side threshold value TH in the processing in FIG. 6, but the processing is not limited to this.

The reward r1 in accordance with the gearshift time Tsft is permitted to be other than zero when the oil temperature Toil is equal to or lower than the low-temperature-side threshold value TL in the processing in FIG. 6, but the processing is not limited to this.

The reward r2 in accordance with the flare amount maximum value ΔNm2max is permitted to be other than zero when the oil temperature Toil is equal to or higher than the high-temperature-side threshold value TH in the processing in FIG. 6, but the processing is not limited to this.

The reward r2 in accordance with the flare amount maximum value ΔNm2max is set to zero regardless of the flare amount maximum value ΔNm2max when the oil temperature Toil is equal to or lower than the low-temperature-side threshold value TL in the processing in FIG. 6, but the processing is not limited to this.

Although actions other than the greedy action ag are permitted to be employed in the above second embodiment even when the reward r for phase 3 is set to zero, an arrangement may be made where only the greedy action ag is employed.

Regarding Drivetrain Device

The drivetrain device to be operated in accordance with values of the action variable based on the relation-defining data DR is not limited to a stepped transmission 26, and may be a variable transmission, for example. Also, this drivetrain device may be the internal combustion engine 10, for example. Also, this drivetrain device may be a drive circuit of a rotating electrical machine, such as the first inverter 23 or the second inverter 25, or the like, for example. In such cases as well, there is a possibility that performing reinforcement learning when an abnormality is occurring may inappropriately update the relation-defining data DR, and accordingly restricting updating such as described in the above embodiments is effective. Also, under extremely low temperatures, friction of an internal combustion engine may become excessively large, and output of a rotating electrical machine may be reduced due to lower output from a battery. When reinforcement learning is performed under such conditions, there is a possibility that the relation-defining data DR may be inappropriately updated, and accordingly restricting updating such as described in the above embodiments is effective.

Regarding State Used for Selection of Value of Action Variable Based on Relation-Defining Data States used for selection of values of the action variable based on the relation-defining data are not limited to those exemplified in the above-described embodiments. For example, a state variable dependent on a previous action variable value regarding phase 2 and phase 3 is not limited to the rotation speed Nm2, and may be the flare amount ΔNm2, for example. The state variable may also be the amount of heat generated, for example. In the first place, a state variable dependent on a previous action variable value regarding phase 2 and phase 3 does not need to be included in the states used for selection of the value of the action variable, when using a profit-sharing algorithm or the like, as described later in the section "Updating Map".

Including the accelerator operation amount ACCP in the state variable is not indispensable.

Including the oil temperature Toil in the state variable is not indispensable.

Including the phase variable Vpase in the state variable is not indispensable. For example, time from starting gearshift, rotation speed of input shaft, and gearshift variable ΔVsft may be included in the state variable, an action value function Q may be constructed that instructs actions every time, and reinforcement learning may be performed using this action value function. In this arrangement, the gearshift period is not specified to be three phases in advance.

For example, when drivetrain device to be operated based on values of the action variable is an internal combustion engine or a drive circuit of a rotating electrical machine, as described in the section "Regarding Drivetrain Device", the accelerator operation amount ACCP or the like may be included in the state.

Regarding Action Variable

The action variable for phase 3 has been described as being pressure rise rate in the above embodiments, but is not limited to this, and phase 3 may be further subdivided, and pressure command values at each stage may be the action variable, for example.

Pressure command value or pressure rise rate is described as the action variable in the above embodiments, but is not limited to this, and may be an instruction value of applied electrical current to the solenoid valves 28a, for example.

When the drivetrain device to be operated in accordance with values of the action variable is an internal combustion engine, as described in the section "Regarding Drivetrain Device", for example, fuel injection amount and injection timing, for example, may be included in the action variable. Also, when the internal combustion engine is a spark-ignition internal combustion engine, for example, the throttle valve and the ignition timing may be included in the action variable.

When the drivetrain device to be operated based on values of the action variable is a drive circuit of a rotating electrical machine, as described in the section "Regarding Drivetrain Device", for example, the torque or the electrical current of the rotating electrical machine may be included in the action variable.

Regarding Relation-Defining Data

The action value function Q is described as a table-format function in the above embodiments, but is not limited to this. For example, a function approximator may be used.

For example, instead of using the action value function Q, policy π may be expressed by a function approximator in which state s and action a are independent variables, and a probability of taking an action a is a dependent variable, and a parameter that sets the function approximator may be updated in accordance with the reward r.

Regarding Operating Processing

For example, when the action value function Q is a function approximator, as described in the section "Regarding Relation-Defining Data", an action a that maximizes the action value function Q may be selected by inputting each of discrete values regarding actions that are independent variables of the table type function in the above embodiments, to the action value function Q along with the state s.

For example, when the policy π is a function approximator in which state s and action a are independent variables, and a probability of taking an action a is a dependent variable, as described in the section "Regarding Relation-Defining Data", an action may be selected based on a probability indicated by the policy π.

Regarding Updating Map

So-called Q learning, which is policy-off TD learning is exemplified regarding the processing of S26, but is not limited to this. For example, learning may be performed using the so-called state-action-reward-state-action (SARSA) algorithm, which is policy-on TD learning. Moreover, methods are not limited to using TD, and the Monte Carlo method may be used, or eligibility traces may be used, for example.

A map following a profit-sharing algorithm, for example, may be used as the updating map for the relation-defining data based on reward. When an example of using a map following a profit-sharing algorithm is a modification of the processing exemplified in FIG. 2, the following may be carried out, for example. That is to say, calculation of the reward is executed at the stage of completing the gearshift. The calculated reward is then distributed to rules determining each state-action pair involved in the gearshift, following a reinforcement function. A known geometric decreasing function, for example, may be used here as the reinforcement function. In particular, the gearshift time Tsft has a strong correlation with the value of the action variable in phase 3, and accordingly, when distributing the reward in accordance with the gearshift time Tsft, using a geometric decreasing function for a reinforcement function is particularly effective, although this is not limited to a geometric decreasing function. For example, when giving a reward based on the amount of heat generated, as described later in the section "Regarding Reward Calculating Processing", the distribution of the reward in accordance with the amount of heat generated may be greatest for phase 1, in light of the strong correlation between the amount of heat generated and the value of the action variable in phase 1.

For example, when expressing the policy π using a function approximator as described in the section "Regarding Relation-Defining Data", and directly updating based on the reward r, an updating map may be configured using a policy gradient method.

The arrangement is not limited to just one of the action value function Q and the policy π being the object of direct updating by the reward r. For example, the action value function Q and the policy π may each be updated, as in an actor-critic method. Also, the actor-critic method is not limited to this, and a value function V may be the object of updating, instead of the action value function Q, for example.

Regarding Reward Calculating Processing

In the above embodiments, processing of giving a larger reward when the gearshift time Tsft is short as compared to when the gearshift time Tsft is long, and processing of giving a larger reward when the flare amount ΔNm2 is small as compared to when the flare amount ΔNm2 is large, are executed, but just one thereof may be executed instead of executing both.

Processing of giving a larger reward when the amount of heat generated by the friction engaging elements in the gear ratio switching period is small as compared to when the amount of heat generated is large may be included in the reward calculating processing.

For example, when taking the torque or output of a rotating electrical machine as an action variable, as described in the section "Regarding Action Variable", processing of giving a larger reward when the battery charge rate is within a predetermined range as compared to when the battery charge rate is not within the predetermined range, or processing of giving a larger reward when the battery temperature is within a predetermined range as compared to when the battery temperature is not within the predetermined range, may be included.

For example, when taking the throttle valve or the like as an action variable, as described in the section "Regarding Action Variable", processing of giving a larger reward when the response to an acceleration request by an accelerator operation is high as compared to when the response to an acceleration request is low may be included. Note that the response here can be identified by the rate of increase in torque of the internal combustion engine that is identified from the intake airflow and so forth, for example.

Regarding Vehicle Control System

Processing of deciding action based on the policy π (processing of S16, S28) is described as being executed at the vehicle side in the example shown in FIG. 8, but the processing is not limited to this. For example, an arrangement may be made where data acquired by the processing of S12 is transmitted from the vehicle VC(1), the data analyzing center 90 decides an action a using the data transmitted thereto, and transmits the decided action to the vehicle VC(1).

The vehicle control system is not limited to being configured of the control device 40 and the data analyzing center 90. For example, a mobile terminal of a user may be used instead of the data analyzing center 90. Also, a vehicle control system may be configured from the control device 40, the data analyzing center 90, and the mobile terminal. This can be realized by executing processing of S16 and S28 by the mobile terminal, for example.

Regarding Executing Device

The executing device is not limited to being provided with the CPU 42 (92) and the ROM 44 (94) and executing software processing. For example, a dedicated hardware circuit such as an application-specific integrated circuit (ASIC) or the like, for example, that performs hardware processing may be provided, to perform at least part of software processing in the above embodiments. That is to say, the executing device may have a configuration that is one of the following (a) to (c). (a) A processing device that executes all of the above processing following a program, and a program storage device such as ROM or the like that stores the program, are provided. (b) A processing device and program storage device that execute part of the above processing following a program, and a dedicated hardware circuit that executes the remaining processing, are provided. (c) A dedicated hardware circuit that executes all of the above processing is provided. A plurality of software executing devices each provided with a processing device and a program storage device, and a plurality of dedicated hardware circuits, may be provided.

Regarding Storage Device

In the above embodiments, the storage device storing the relation-defining data DR, and the storage device (ROM 44, 94) storing the learning program DLP, the learning sub-program DLPa, and the learning main program DLPb, are described as being different storage devices, but are not limited to this.

Regarding Vehicle

The vehicle is not limited to a series-parallel hybrid vehicle, and may be a series hybrid vehicle or a parallel hybrid vehicle. Note that the vehicle is not limited to a vehicle that is provided with an internal combustion engine and a motor generator as onboard rotating machines. For example, the vehicle may be a vehicle that is provided with an internal combustion engine but not provided with a motor generator, or for example, may be a vehicle that is provided with a motor generator but not provided with an internal combustion engine.

What is claimed is:

1. A vehicle control device comprising:
   a storage device that stores relation-defining data that is data for defining a relation between a state of a vehicle and an action variable that is a variable relating to operation of a drivetrain device installed in the vehicle; and
   an executing device configured to
      acquire the state based on a detection value of an onboard sensor,
      operate the drivetrain device based on a value of the action variable that is determined based on the relation-defining data and the state acquired by the executing device,
      derive a reward such that the reward is larger when the state of the drivetrain device based on the state acquired by the executing device satisfies a predetermined criterion than when the state of the drivetrain device based on the state acquired by the executing device does not satisfy the predetermined criterion,
      perform an updating of the relation-defining data using an updating map of which arguments are the state acquired by the executing device, the value of the action variable used in operating the drivetrain device, and the reward corresponding to the operation and which returns the relation-defining data that is updated such that an expected income regarding the reward calculated when the drivetrain device is operated following the relation-defining data increases, and
      restrict the updating of the relation-defining data such that an updating amount of the relation-defining data is smaller when the drivetrain device is subject to a predetermined restriction than when the drivetrain device is not subject to the predetermined restriction.

2. The vehicle control device according to claim 1, wherein:
   the executing device is configured to determine whether an abnormality exists in the drivetrain device; and
   the drivetrain device is subject to the predetermined restriction when the executing device determines that the abnormality exists in the drivetrain device.

3. The vehicle control device according to claim 1, wherein:
   the drivetrain device includes a transmission; and
   the drivetrain device is subject to the predetermined restriction when a temperature of operating oil of the transmission is equal to or higher than a high-temperature threshold value.

4. The vehicle control device according to claim 1, wherein:
   the drivetrain device includes a transmission; and
   the drivetrain device is subject to the predetermined restriction when a temperature of operating oil of the transmission is equal to or lower than a low-temperature threshold value.

5. The vehicle control device according to claim 1, wherein the updating amount is zero when the drivetrain device is subject to the predetermined restriction.

6. A vehicle control system, comprising:
   a storage device that stores relation-defining data that is data for defining a relation between a state of a vehicle and an action variable that is a variable relating to operation of a drivetrain device installed in the vehicle; and
   an executing device including
      a first executing device that is installed in the vehicle, and
      a second executing device that is separate from an onboard device,
   wherein
   the first executing device is configured to
      acquire the state based on a detection value of an onboard sensor, and
      operate the drivetrain device based on a value of the action variable that is determined based on the relation-defining data and the state acquired by the first executing device,
   at least one of the first executing device or the second executing device is configured to derive a reward such that the reward is larger when the state of the drivetrain device based on the state acquired by the first executing device satisfies a predetermined criterion than when the state of the drivetrain device based on the state acquired by the first executing device does not satisfy the predetermined criterion,
   the second executing device is configured to perform an updating of the relation-defining data using an updating map of which arguments are the state acquired by the first executing device, the value of the action variable used in operating the drivetrain device, and the reward corresponding to the operation and which returns the relation-defining data that is updated such that an expected income regarding the reward calculated when the drivetrain device is operated following the relation-defining data increases, and
   the at least one of the first executing device or the second executing device is further configured to restrict the updating of the relation-defining data such that an updating amount of the relation-defining data is smaller when the drivetrain device is subject to a predetermined restriction than when the drivetrain device is not subject to the predetermined restriction.

7. A vehicle control device comprising a first executing device included in a vehicle control system, wherein
   the vehicle control system includes
      a storage device that stores relation-defining data that is data for defining a relation between a state of a vehicle and an action variable that is a variable relating to operation of a drivetrain device installed in the vehicle, and
      an executing device including
         the first executing device that is installed in the vehicle, and
         a second executing device that is separate from an onboard device, the first executing device is configured to
  acquire the state based on a detection value of an onboard sensor, and
  operate the drivetrain device based on a value of the action variable that is determined based on the relation-defining data and the state acquired by the first executing device,
at least one of the first executing device or the second executing device is configured to derive a reward such that the reward is larger when the state of the drivetrain device based on the state acquired by the first executing device satisfies a predetermined criterion than when the state of the drivetrain device based on the state acquired by the first executing device does not satisfy the predetermined criterion,
the second executing device is configured to perform an updating of the relation-defining data using an updating map of which arguments are the state acquired by the first executing device, the value of the action variable used in operating the drivetrain device, and the reward corresponding to the operation and which returns the relation-defining data that is updated such that an expected income regarding the reward calculated when the drivetrain device is operated following the relation-defining data increases, and
the at least one of the first executing device or the second executing device is further configured to restrict the updating of the relation-defining data such that an updating amount of the relation-defining data is smaller when the drivetrain device is subject to a predetermined restriction than when the drivetrain device is not subject to the predetermined restriction.

8. A vehicle learning device comprising a second executing device included in a vehicle control system, wherein
the vehicle control system includes
  a storage device that stores relation-defining data that is data for defining a relation between a state of a vehicle and an action variable that is a variable relating to operation of a drivetrain device installed in the vehicle, and
  an executing device including
    a first executing device that is installed in the vehicle, and
    the second executing device that is separate from an onboard device,
the first executing device is configured to
  acquire the state based on a detection value of an onboard sensor, and
  operate the drivetrain device based on a value of the action variable that is determined based on the relation-defining data and the state acquired by the first executing device,
at least one of the first executing device or the second executing device is configured to derive a reward such that the reward is larger when the state of the drivetrain device based on the state acquired by the first executing device satisfies a predetermined criterion than when the state of the drivetrain device based on the state acquired by the first executing device does not satisfy the predetermined criterion,
the second executing device is configured to perform an updating of the relation-defining data using an updating map of which arguments are the state acquired by the first executing device, the value of the action variable used in operating the drivetrain device, and the reward corresponding to the operation and which returns the relation-defining data that is updated such that an expected income regarding the reward calculated when the drivetrain device is operated following the relation-defining data increases, and
the at least one of the first executing device or the second executing device is further configured to restrict the updating of the relation-defining data such that an updating amount of the relation-defining data is smaller when the drivetrain device is subject to a predetermined restriction than when the drivetrain device is not subject to the predetermined restriction.

\* \* \* \* \*